April 9, 1957 M. M. TRUE 2,788,197
MOBILE MIXER
Filed Oct. 11, 1954 6 Sheets-Sheet 2
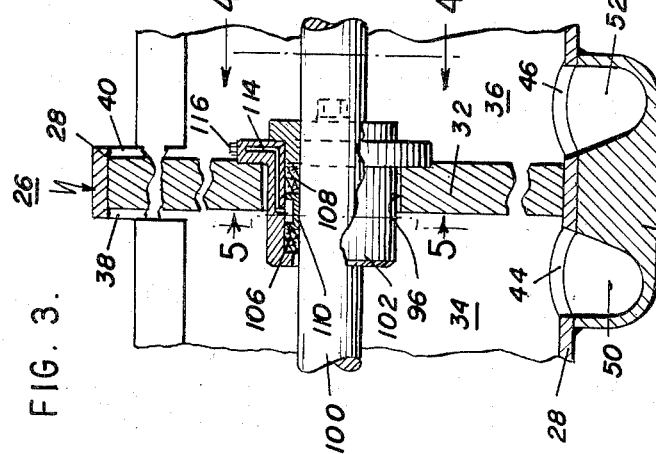
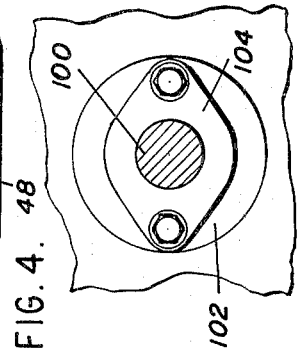
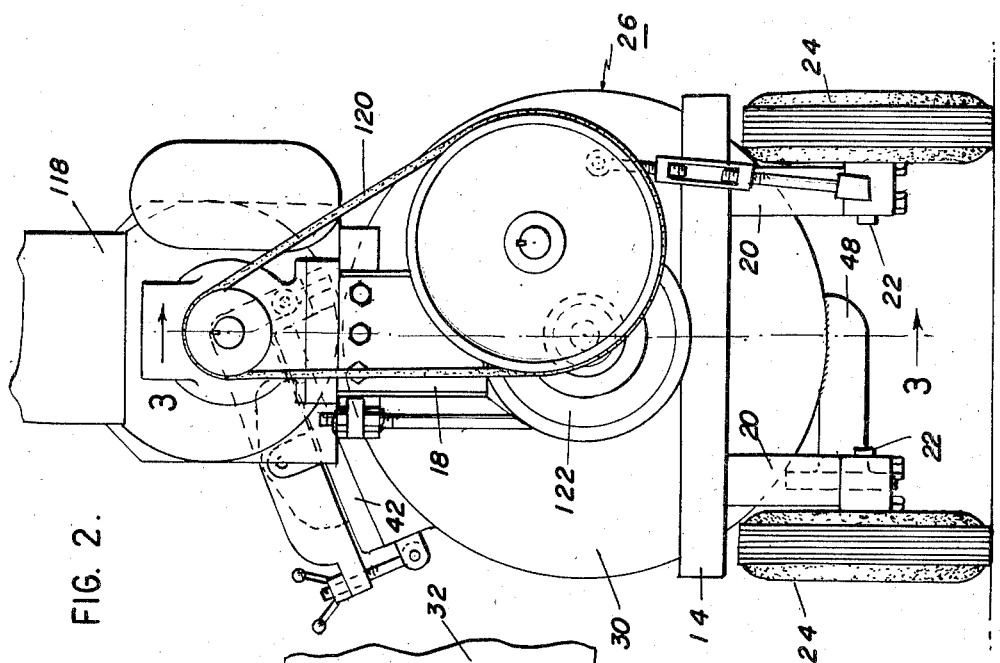
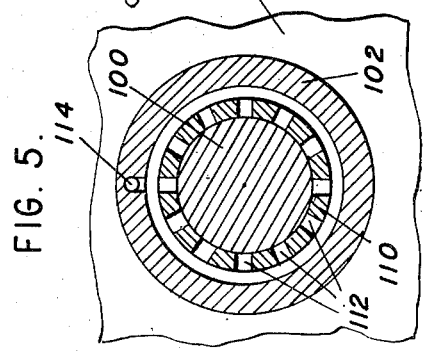
INVENTOR.
MAX M. TRUE
BY
*J. B. Dickman Jr.*
ATTORNEY April 9, 1957 M. M. TRUE 2,788,197
MOBILE MIXER
Filed Oct. 11, 1954 6 Sheets-Sheet 3
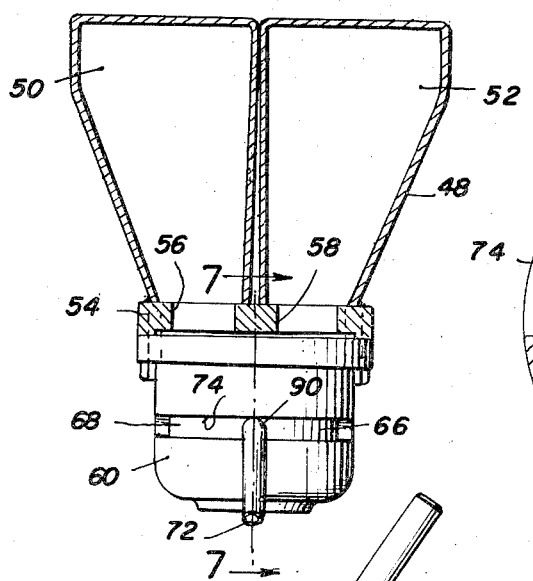
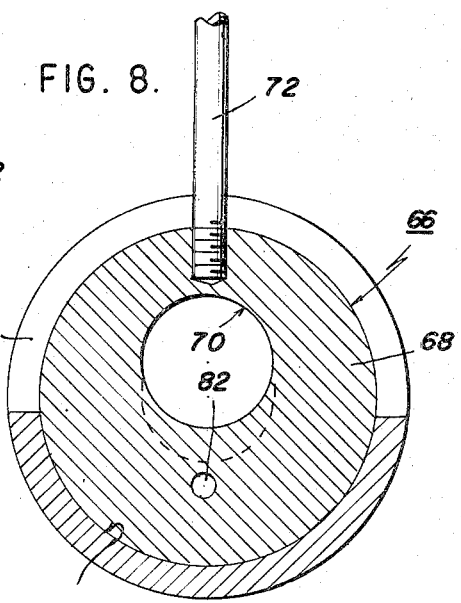
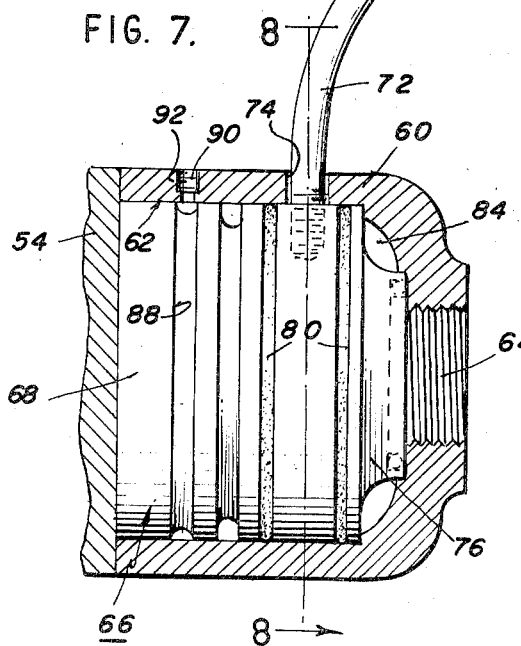
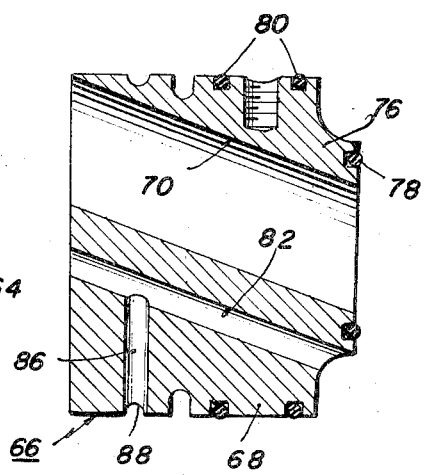
INVENTOR.
MAX M. TRUE
BY
ATTORNEY April 9, 1957

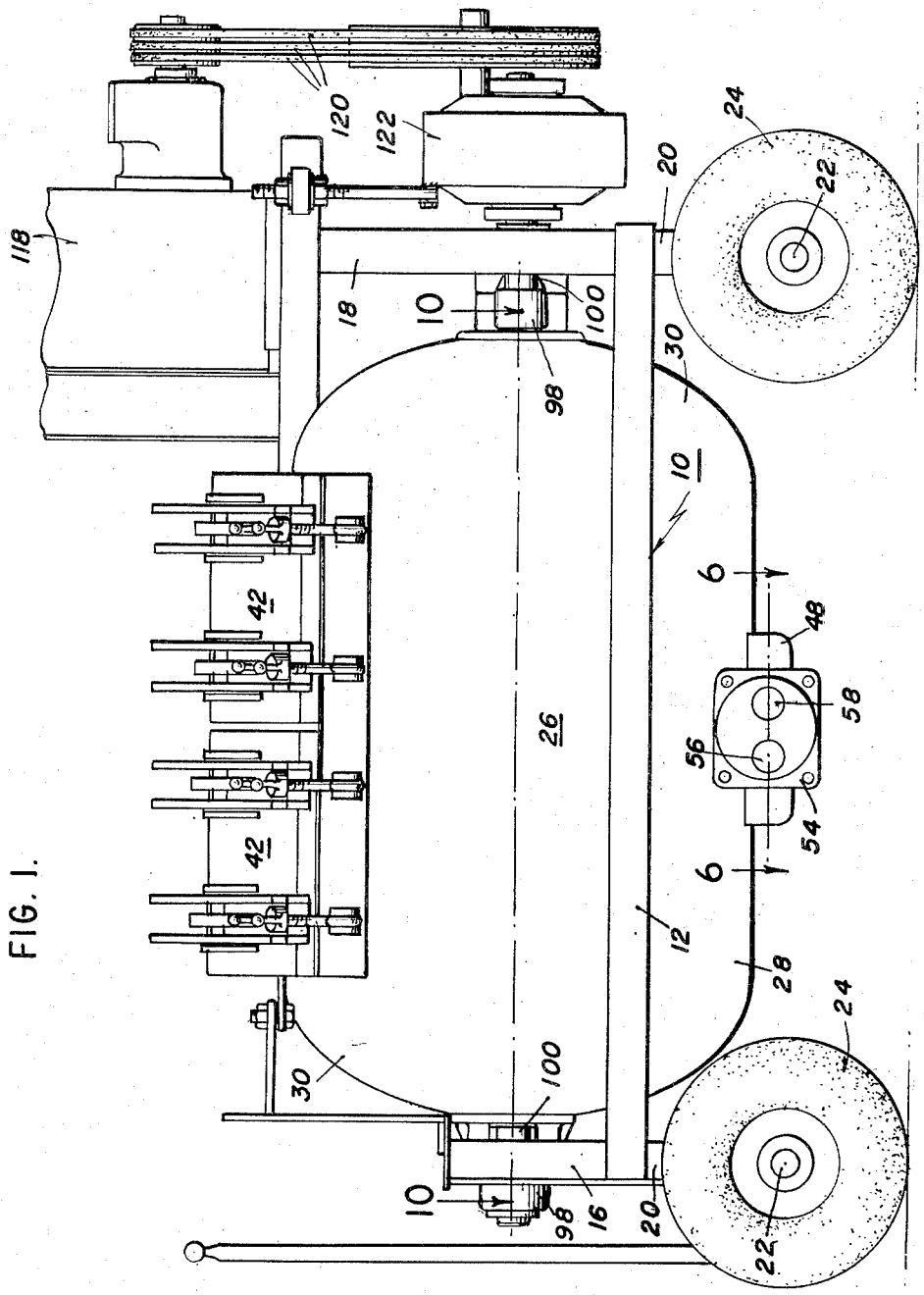

M. M. TRUE 2,788,197

MOBILE MIXER

Filed Oct. 11, 1954

INVENTOR.
MAX M. TRUE

BY

*J B Dickman Jr*
ATTORNEY

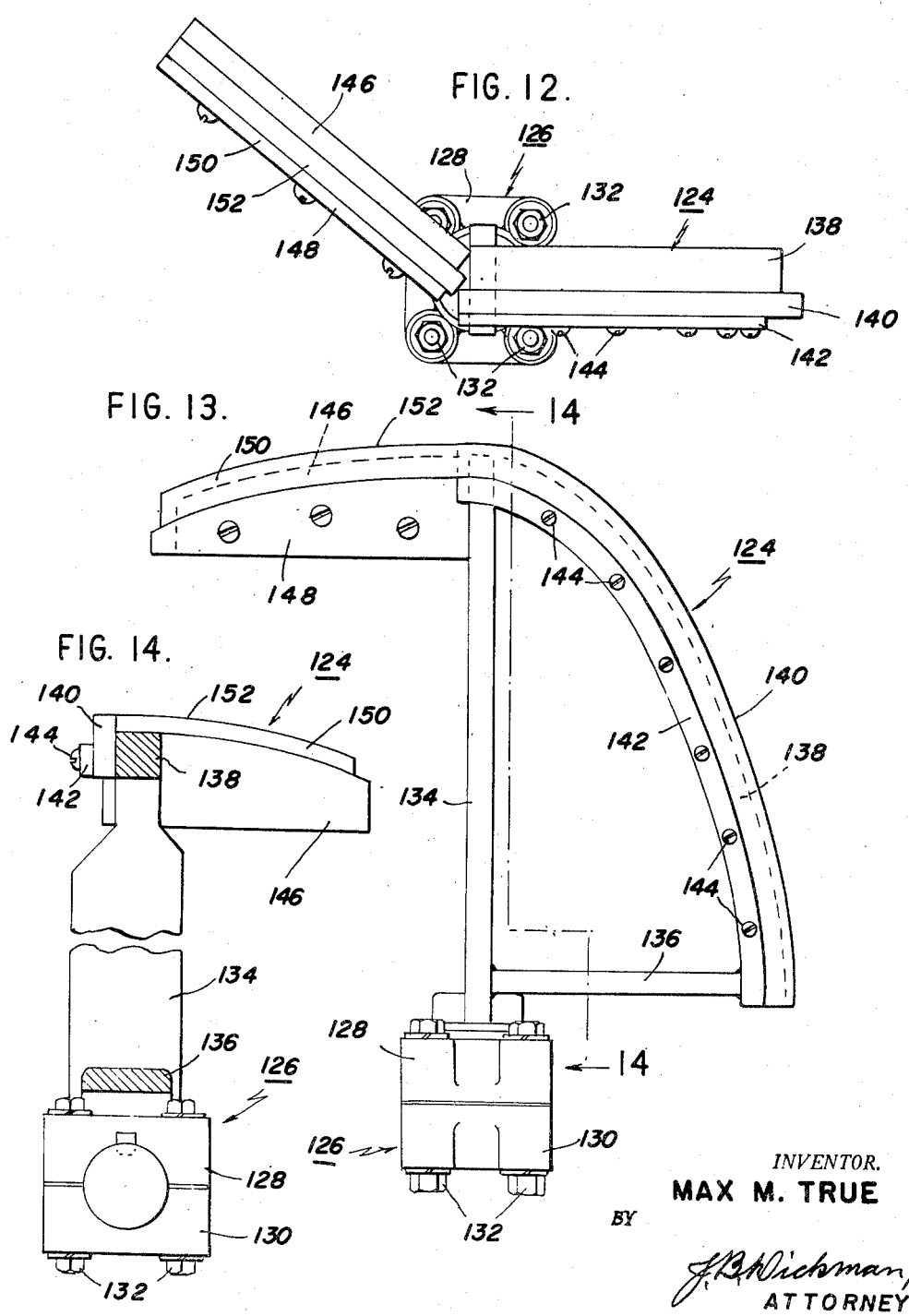

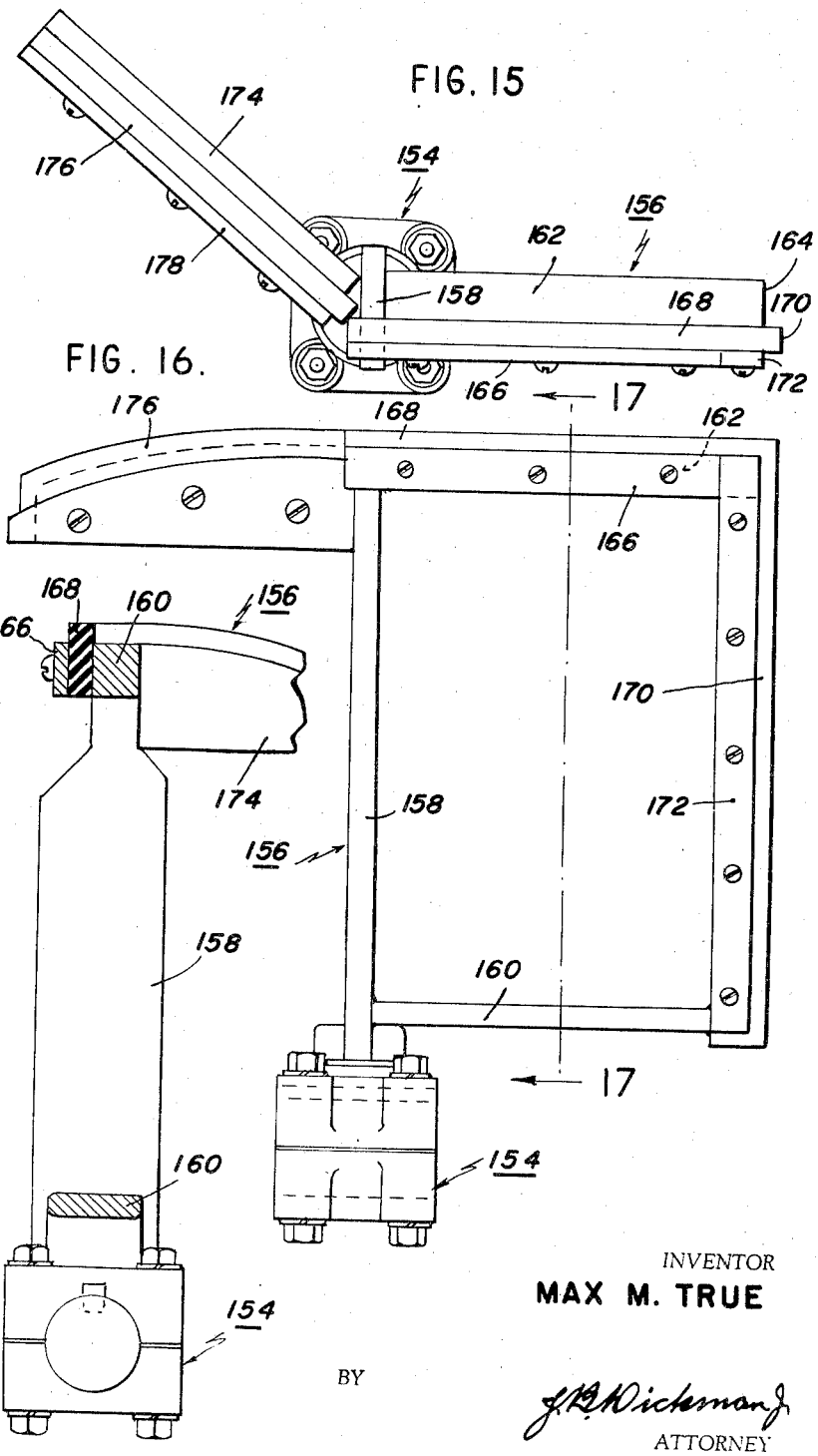

United States Patent Office 2,788,197
Patented Apr. 9, 1957

2,788,197
MOBILE MIXER
Max M. True, Tulsa, Okla.

Application October 11, 1954, Serial No. 461,483

4 Claims. (Cl. 259—46)

This invention relates to a mobile mixer and has for its primary object to intimately intermingle the components of plasticized material such as wall plaster.

Another object is to maintain available a constant supply of mixed plasticized material ready for instant use.

A further object is to mix one batch of plasticized material while an adjacent batch is being used and to enable the rapid switch from a chamber that is about to become exhausted to an adjacent chamber in which the mixing has been completed so that the plastering operation may progress without interruption.

Still another object is to move the plasticized material toward the adjacent discharge ports of the mixing chambers during the rotation of the agitators.

The above and other objects may be attained by employing this invention which embodies among its features a circular cylindrical tank, a partition wall carried by the drive shaft and extending outwardly therefrom within the chambers, wipers of resilient flexible material carried by the agitators and engaging the walls of the chambers, a manifold carried by the tank and extending downwardly therefrom beneath the partition wall, said manifold having spaced discharge ports opening through one end thereof and communicating with the chambers, a valve mounted on the manifold to rotate about an axis which extends between the discharge ports, and said valve having a discharge port extending therethrough and being adapted upon rotation of the valve to selectively register with a discharge port in the manifold.

In the drawings:

Fig. 1 is a side view in elevation of a mobile mixer embodying the features of this invention, Fig. 2 is an end view in elevation of the mixer shown in Fig. 1, Fig. 3 is an enlarged fragmentary sectional view taken substantially on the line 3—3 of Figure 2, Fig. 4 is a fragmentary sectional view taken substantially on the line 4—4 of Figure 3, Figure 5 is an enlarged sectional view taken substantially on the line 5—5 of Figure 3, Figure 6 is an enlarged horizontal sectional view taken substantially on the line 6—6 of Figure 1, Figure 7 is an enlarged sectional view taken substantially on the line 7—7 of Figure 6, Figure 8 is a sectional view taken substantially on the line 8—8 of Figure 7, Fig. 9 is an enlarged sectional view through the valve, Figure 10 is a fragmentary horizontal sectional view of the tank, taken substantially on the line 10—10 of Figure 1, Figure 11 is a vertical sectional view taken substantially on the line 11—11 of Figure 10.

Figure 12 is an enlarged top view of one of the outer agitators,

Figure 13 is a side view of the agitator shown in Figure 12,

Fig. 14 is a sectional view taken substantially on the line 14—14 of Figure 13,

Figure 15 is a top view of one of the inner agitators,

Figure 16 is a side view of the agitator shown in Fig. 15, and

Fig. 17 is a sectional view taken substantially on the line 17—17 of Fig. 16.

Figure 10:
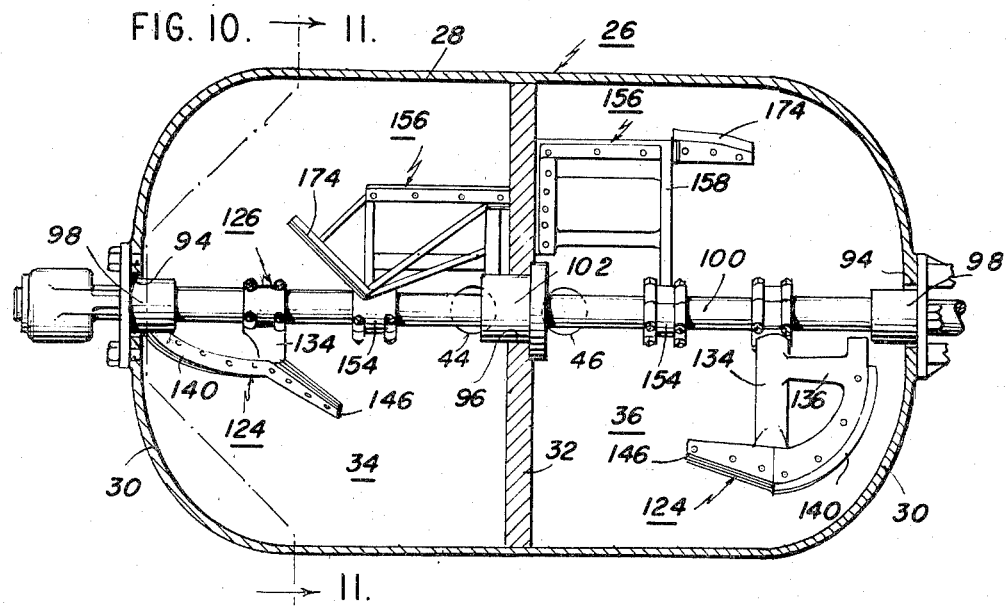
Figure 11:
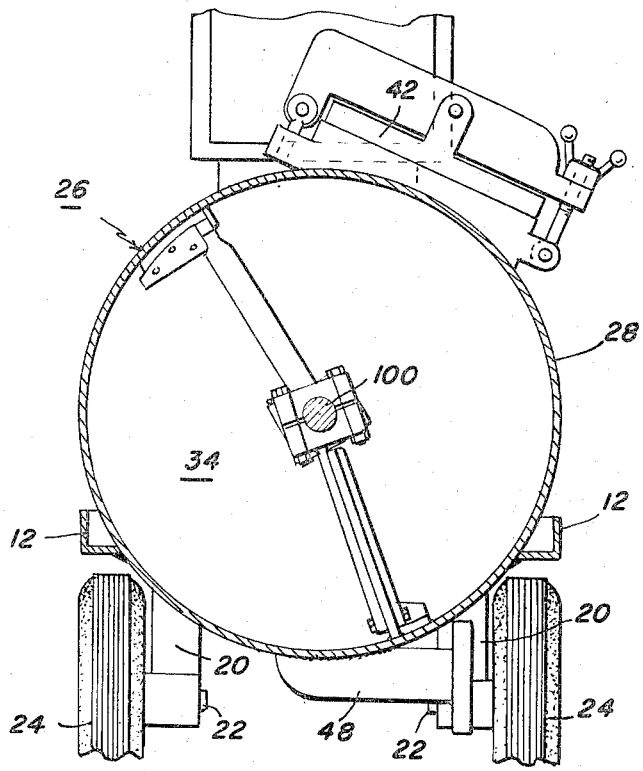

Referring to the drawings in detail, a frame designated generally 10 comprises spaced parallel side bars 12 joined at opposite ends by end bars 14 carrying intermediate their ends upwardly extending support columns 16 and 18. Carried by and extending downwardly from the end bars 14 are legs 20 carrying adjacent their lower ends spindles 22 on which ground wheels 24 are mounted to rotate.

Carried by the side bars 12 and extending between the side bars 12 and the end bars 14 is a tank designated generally 26 which comprises a hollow circular cylindrical body 28 closed at opposite ends by concave-convex end walls 30. A partition wall 32 extends transversely across the tank 26 midway between the end walls 30 and separates the tank into two separate mixing chambers 34 and 36, and extending through the top of the cylindrical body 28 adjacent opposite sides of the partition wall 32 are filling openings 38 and 40 which open respectively into the chambers 34 and 36. Hinged covers 42 are carried by the tank 26 for movement into and out of closing relation to the openings 38 and 40, and extending through the bottom of the cylindrical body 28 on opposite sides of the partition 32 are openings 44 and 46 which communicate respectively with the chambers 34 and 36. A manifold 48 is welded or otherwise secured to the manifold 48 adjacent one side of the tank 26 and opening through said plate are spaced ports 56 and 58 which communicate with the passages 50 and 52 respectively.

Bolted or otherwise removably secured to the plate 54 is a cap 60 having an enlarged bore 62 opening through the end thereof adjacent the plate 54 and an internally screw threaded opening 64 extending into its opposite end and communicating with the bore 62. A valve designated generally 66 is fitted into the bore 62 and comprises a valve body 68 having a passage 70 extending angularly therethrough so that when the valve 66 is in one position communication will be established between the port 56 and the threaded opening 64 and when in another position communication will be established between the port 58 and the threaded opening 64. A handle 72 is threadedly engaged with the valve body 68 and extends radially outwardly therefrom and through an arcuate slot 74 which extends through the cap 60. A nose 76 is carried by the valve body and engages the end of the cap 60 in concentric spaced relation to the threaded opening 64, and carried by said nose is an annular sealing ring 78 of the type commonly referred to as an O-ring. Similar sealing rings 80 are carried by the valve body 68. Extending through the valve body 68 in spaced parallel relation to passage 70 is a passage 82 which communicates at one end with an annular chamber 84 defined between the nose 76 and the adjacent end of the cap 60, and opening into the passage 82 is a radial passage 86 which communicates with an annular groove 88 formed in the valve body 68. Extending through the cap 60 in registration with the groove 88 is an opening 90 through which lubricant may be introduced into the groove 88, passage 86, passage 82 and into the annular chamber 84 to establish a fluid tight junction between the cap 60 and the valve 66. A suitable plug 92 is threadedly engaged with the opening 90 to close it and exclude dust and dirt from the valve.

Extending through opposite end walls 30 of the tank 26 are aligned openings 94 which lie concentric about the longitudinal axis of the tank 26 and a similar opening 96 extends through the partition wall 32 in concentric relation to said longitudinal axis. Carried by the support columns 16 and 18 and extending through the openings 94 are bearings 98 in which is journaled an impeller shaft 100. Mounted in the opening 96 in the partition wall 32 in surrounding relation to the shaft 100 is a bushing 102 defining with a clamp plate 104 a packing gland enclosing spaced packing rings 106 and 108 which are separated by an annular lubricant distributor 110 of transversely channel shape having radial lubricant distributing ports 112 extending therethrough. The channel defines an annular lubricant reservoir which may be periodically filled with lubricant through a passage 114 which extends through the bushing 102 which opens at one end into the channel and is closed at its opposite end by a threaded plug 116.

A prime mover 118 is mounted on the column 18 above the shaft 100 and is operatively connected to said shaft 100 through the medium of drive belts 120 and a speed reduction gear train housed within a casing 122. It will thus be seen that upon energization of the prime mover 118, the shaft 100 will be rotated.

Mounted on the shaft 100 adjacent opposite end walls 30 of the tank 26 are outer blade assemblies 124 each comprising a split collar designated generally 126 composed of upper and lower shaft engaging halves 128 and 130 respectively held in shaft clamping engagement by bolts 132. Carried by the upper shaft engaging half 128 and extending outwardly therefrom in an arm 134 carrying adjacent its junction with the shaft engaging half 128 a laterally extending leg 136. Carried by and extending between the end of the arm 134 remote from the split collar 126 and the end of the laterally extending leg 136 remote from the arm 134 is a curved blade support 138 which follows the contour of the inner face of an adjacent end wall 30. A curved wiper blade 140 of resilient deformable material is clampingly engaged with the curved blade support 138 by a curved clamping strip 142 which is attached to the blade support 138 by screws 144. A wing 146 is carried by the arm 134 and extends outwardly therefrom adjacent the end thereof remote from the split collar 126 in a direction away from and at an angle to the blade support 138. The outer edge of the wing 146 curves inwardly toward the end of the arm 134 adjacent the split collar 126 as it recedes from the arm, and clamped to the wing by a clamp plate 148 is a wiper blade 150 of elastic deformable material. The outer edge 152 of the wiper blade 150 is curved to conform to the inner surface of the circular cylindrical body 28 adjacent the end walls 30.

Clamped to the drive shaft 100 on opposite sides of the partition wall 32 are the split collars 154 of inner blade assemblies designated generally 156. Each such blade assembly comprises a split collar 154 corresponding to the split collars 126 previously described, and carried by each split collar 154 and extending radially outwardly therefrom is an arm 158 carrying adjacent its junction with its split collar 154 a lateral extension 160. A blade support 162 is carried by the arm 158 and extends laterally outwardly therefrom in parallel relation to and above the lateral extension 160. Connecting the ends of the lateral extension 160 and the blade support 162 and extending therebetween in parallel relation to the arm 158 is a blade carrier 164. Clamped to the blade support 162 by a clamping strip 166 is a wiping blade 168 of resilient deformable material which as the shaft 100 is rotated is adapted to wipe the inner surface of the cylindrical body 28 adjacent the partition wall 32. A similar wiping blade 170 is clamped to the blade carrier 164 by a suitable clamping strip 172 and is adapted when the shaft 100 is rotated to wipe the adjacent face of the partition wall 32. A wing 174 is carried by the arm 158 and extends outwardly therefrom adjacent and at an obtuse angle to the blade support 162. A wiping blade 176 is clamped to the wing 174 by a clamping strip 178 and the outer surface of the blade 176 is convex to enable it to follow the curvature of the inner surface of the cylindrical body 28. It is to be noted that parts in which the blades 150 and 176 rotate overlap so as to thoroughly intermingle the contents of the mixing chambers and advance it toward the openings 44 and 46.

In use the materials to be mixed are introduced into the mixing chambers 34 and 36 through the openings 38 and 40 respectively after which the openings are closed by the covers 42. With the passage 70 in the valve body 68 out of registration with either port 56 or 58, the prime mover 118 is set into operation to impart rotary motion to the shaft 100 through the drive belts 120 and speed reduction gearing 122. As the drive shaft 100 rotates the mixing blade assemblies 124 and 154 will rotate in the chambers 34 and 36 to agitate and thoroughly intermingle the materials contained therein. The resilient deformable wiper blades 140 of the assemblies 124 will have wiping contact with the inner concave sides of the end walls 30 substantially from the bushings 98 to the junctions of said end walls with the hollow cylindrical body 28. The wiper blades 152 carried by the angularly disposed wings 146 of the assembly 124 will engage the inner side of the circular cylindrical body 28 adjacent the junctions of the body 28 with the end walls 30, and being angularly disposed, the wings will tend to sweep the materials being mixed toward the partition wall 32. The areas of the inner side of the circular cylindrical body that are swept by the blades 152 are also swept by the blades 176 carried by the wings 174 of the inner blade assemblies 156, which like the wings 148 are angularly disposed relative to the longitudinal axis of the tank 26 to cause the material being mixed to be directed toward the partition wall 32. The portions of the inner surface of the circular cylindrical body 28 lying between the portions thereof which are swept by the blades 152 and 176 are swept by the blades 168 of the inner blade assemblies 156 and the portions of the partition wall 32 lying between the bushing 102 and the inner side of the body 28 are swept by the blades 170 of the inner blade assemblies 156. It will thus be seen that as the shaft 100 rotates substantially the entire inner surfaces of the chambers 34 and 36 will be wiped to preclude the possibility of the mixed plasticized materials sticking thereto. By connecting a suitable source of material distribution to the threaded opening 64 in the cap 60 and rotating the valve 66 to move the passage 70 into registration with a selected port 56 or 58 the plasticized material contained in a selected chamber 34 or 36 may be discharged therefrom. Obviously when one chamber becomes exhausted, the other may be placed in service by the simple rotation of the valve 66, and the exhausted chamber may be refilled and the mixing therein resumed without interrupting the plastering operation.

I claim:

1. A mixer for intimately intermingling plasticized material comprising a horizontal hollow cylindrical body, end walls closing opposite ends of said body to define a tank, a partition wall carried by the body and extending transversely thereacross midway between the end walls to define chambers of substantially equal volume, a manifold carried by the tank and extending transversely below the partition thereof, said manifold having ports which open on opposite sides with respect to said partition through one end of said manifold in horizontally spaced parallel relation and which communicate with the respective chambers, a valve carried by the manifold to rotate about a horizontal axis which lies between the ports therein, said valve having a discharge port extending therethrough for selective registration with a selected port in the manifold, and means within the chambers for mixing the contents thereof and moving them toward said manifold ports.

2. A mixer for intimately intermingling plasticized material comprising a horizontal hollow cylindrical body, end walls closing opposite ends of said body to define a tank, a partition wall carried by the body and extending transversely thereacross midway between the end walls to define chambers of substantially equal volume, a manifold carried by the tank and extending transversely below the partition thereof, said manifold having ports which open on opposite sides with respect to said partition through one end of said manifold in horizontally spaced parallel relation and which communicate with the respective chambers, a valve carried by the manifold to rotate about a horizontal axis which lies between the ports therein, said valve having a discharge port extending therethrough for selective registration with a selected port in the manifold, a common drive shaft carried by the end walls and the partition and extending axially through the tank, and agitators carried by the drive shaft and operable in the chambers for mixing the contents thereof, and a prime mover carried by the tank and operatively connected to the drive shaft for rotating it and operating the agitators to intimately mix the contents of the chambers.

3. A mixer for intimately intermingling plasticized material comprising a horizontal hollow cylindrical body, end walls closing opposite ends of said body to define a tank, a partition wall carried by the body and extending transversely thereacross midway between the end walls to define chambers of substantially equal volume, a manifold carried by the tank and extending transversely below the partition thereof, said manifold having ports which open on opposite sides with respect to said partition through one end of said manifold in horizontally spaced parallel relation and which communicate with the respective chambers, a valve carried by the manifold to rotate about a horizontal axis which lies between the ports therein, said valve having a discharge port extending therethrough for selective registration with a selected port in the manifold, a common drive shaft carried by the end walls and the partition and extending axially through the tank, and agitators carried by the drive shaft and operable in the chambers for mixing the contents thereof, longitudinally spaced pairs of agitators mounted on the drive shaft and operable within the chambers for intimately mixing the contents thereof, and wiper blades of resilient flexible material carried by the agitators and engaging the inner sides of the walls of the chambers to move the contents toward the manifold communication.

4. A mixer for intimately intermingling plasticized material comprising a horizontal hollow cylindrical body, end walls closing opposite ends of said body to define a tank, a partition wall carried by the body and extending transversely thereacross midway between the end walls to define chambers of substantially equal volume, a manifold carried by the tank and extending transversely below the partition thereof, said manifold having ports which open on opposite sides with respect to said partition through one end of said manifold in horizontally spaced parallel relation and which communicate with the respective chambers, a valve carried by the manifold to rotate about a horizontal axis which lies between the ports therein, said valve having a discharge port extending therethrough for selective registration with a selected port in the manifold, a common drive shaft carried by the end walls and the partition and extending axially through the tank, and agitators carried by the drive shaft and operable in the chambers for mixing the contents thereof, longitudinally spaced pairs of agitators mounted on the drive shaft and operable within the chambers for intimately mixing the contents thereof, and angular extensions on the agitators moving in overlapping circular paths for moving the contents of the chambers toward the manifold communication.

References Cited in the file of this patent

UNITED STATES PATENTS

| 257,789 | Venable | May 9, 1882 |
| 805,893 | Thomas | Nov. 28, 1905 |
| 2,034,417 | Perry | Mar. 17, 1936 |
| 2,525,573 | Zicovich | Oct. 10, 1950 |